United States Patent [19]

Jelks

[11] 4,245,333

[45] Jan. 13, 1981

[54] BEAMFORMING UTILIZING A SURFACE ACOUSTIC WAVE DEVICE

[75] Inventor: Edward C. Jelks, San Diego, Calif.

[73] Assignee: The United States of America as represented by the Secretary of the Navy, Washington, D.C.

[21] Appl. No.: 41,114

[22] Filed: May 21, 1979

[51] Int. Cl.[3] .................................... G01S 3/84

[52] U.S. Cl. .................................... 367/121; 367/123; 343/100 SA; 333/150

[58] Field of Search .................... 367/7, 103, 118, 119, 367/121, 123, 135; 343/100 SA; 333/150, 154

[56] References Cited

U.S. PATENT DOCUMENTS

| | | | |
|---|---|---|---|
| 3,953,825 | 4/1976 | Kino et al. | 367/7 |
| 4,065,736 | 12/1977 | London | 333/154 |
| 4,100,498 | 7/1978 | Alsup et al. | 333/150 |

*Primary Examiner*—Richard A. Farley

*Attorney, Agent, or Firm*—Richard S. Sciascia; Ervin F. Johnston

[57] ABSTRACT

A beamforming apparatus is provided for processing the outputs of a linear array of spaced apart receiving elements. The beamforming apparatus includes a surface acoustic wave device which has a pair of transducers mounted on a substrate in a spaced apart relationship. Each transducer is capable of receiving and converting an electrical chirp signal into an acoustic signal for propagation across the surface of the surface acoustical wave device. A plurality of taps are mounted on the substrate in a spaced apart relationship between the pair of transducers for receiving, sharing and converting the acoustic signals back into electric signals. Each tap is adapted to receive a bias voltage. A device is provided for mixing the signal from each tap with a signal from a respective receiving element so as to produce a plurality of mixed output signals, and another device is provided for summing the mixed output signals so as to provide a summed output signal. The summed output signal may then be processed by an upper sideband filter for controlling an indicating device. With this arrangement the beamforming is independent of the center frequency of the array from about 5 KHZ up to the millimeter frequency range.

9 Claims, 4 Drawing Figures

BEAMFORMING UTILIZING A SURFACE ACOUSTIC WAVE DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a real time beamforming apparatus which utilizes a surface acoustic wave device.

Beamforming can be accomplished with a linear array of listening elements, such as passive hydrophones. The beamforming is accomplished by providing an appropriate delay or phase shift to the outputs from the listening elements so as to obtain a maximum summation thereof. This is called steering the beam, and will provide information on the direction of a target from the linear array of listening elements. A basic patent on the delay line technique for beamforming is illustrated in the patent to G. W. Dewitz, U.S. Pat. No. 3,037,185.

Other techniques for performing the function of beamforming are frequency scanning or digital beamforming. Digital beamformers are presently not practical for listening arrays with high frequencies except for systems where cost and complexity are no object. Frequency scanning has been utilized, however this type of system requires considerably more complicated filtering. Both the digital beamformers and the frequency scanners are costly and bulky.

SUMMARY OF THE INVENTION

The present invention provides a beamforming apparatus which is compact, inexpensive to construct, and highly efficient in processing outputs from a linear array of spaced apart receiving elements. The present beamforming apparatus includes a surface acoustic wave device which has a pair of transducers mounted on a substrate in a spaced apart relationship. Each transducer is capable of receiving and converting an electrical chirp signal into an acoustic signal for propagation across the surface of the surface acoustic wave device. A plurality of taps are mounted on the substrate in a spaced apart relationship between the pair of transducers for receiving, squaring and converting the acoustic signals back into electrical signals. Each tap is adapted to receive a bias voltage. A device is provided for mixing the signal from each tap with a signal from a respective receiving element so as to produce a plurality of mixed output signals, and another device is provided for summing the mixed output signals so as to provide a summed output signal. The summed output signal can then be processed by an upper sideband filter and presented on an oscilloscope for scanning through 180° to find the maximum final output signal which will indicate the direction of a radiating source.

OBJECTS OF THE INVENTION

An object of the present invention is to provide a beamforming apparatus which utilizes a surface acoustic wave device.

Another object is to provide a beamforming apparatus which is compact, inexpensive to construct, and highly efficient for processing outputs of a linear array of spaced apart receiving elements.

These and other objects of the invention will become more readily apparent from the ensuing specification when taken together with the drawings.

DESCRIPTION OF THE PREFERRED EMBODIMENT

Figure 1:
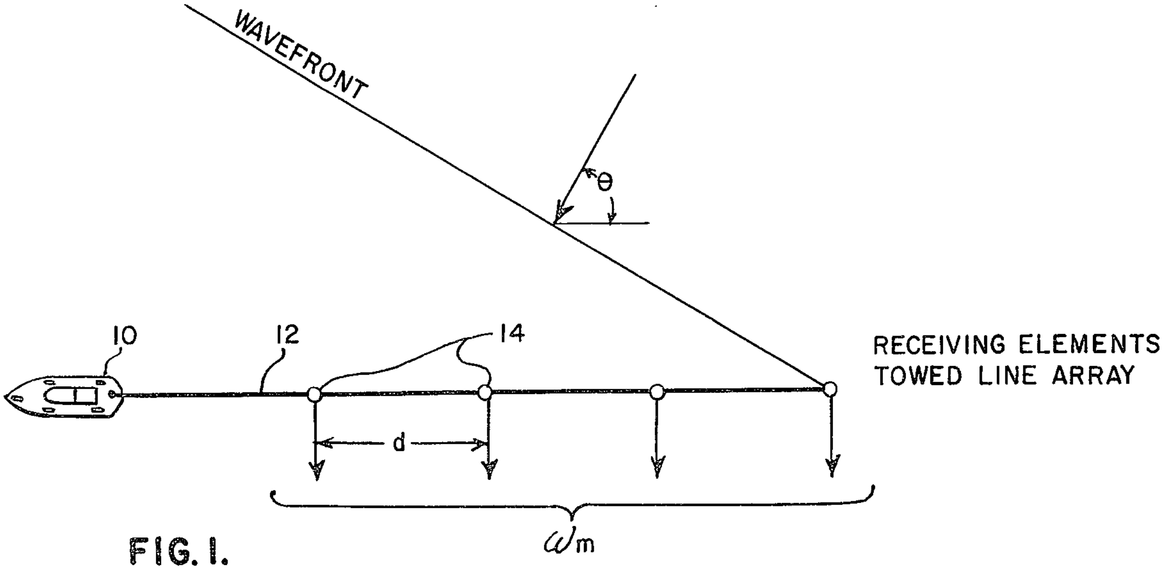
FIG. 1 is a plan view of a surface ship towing a linear array of listening elements which are being subjected to an acoustic wavefront.

Referring now to the drawings wherein like reference numerals designate like or similar parts throughout the several views there is illustrated in FIG. 1 a plan view of a boat or surface ship 10 towing a line 12 which has a plurality of spaced apart listening elements 14. This arrangement, which is referred as a towed line array, may utilize passive hydrophones which are equally spaced from one another. FIG. 1 also illustrates an acoustic wavefront which has emanated from a far field target (not shown). The direction to the far field target, which is normal to the wavefront, with respect to the line array 12 is designated as $\theta$ for a purpose to be described hereinafter. With a proper processing of the signals $\omega_m$ received by the listening elements 14, beamforming can be accomplished so as to ascertain the direction of the far field target which is emanating the acoustic wavefront shown in FIG. 1. The present invention, described hereinbelow, is a very compact, low cost, and efficient apparatus for accomplishing this beamforming function.

Figure 2:
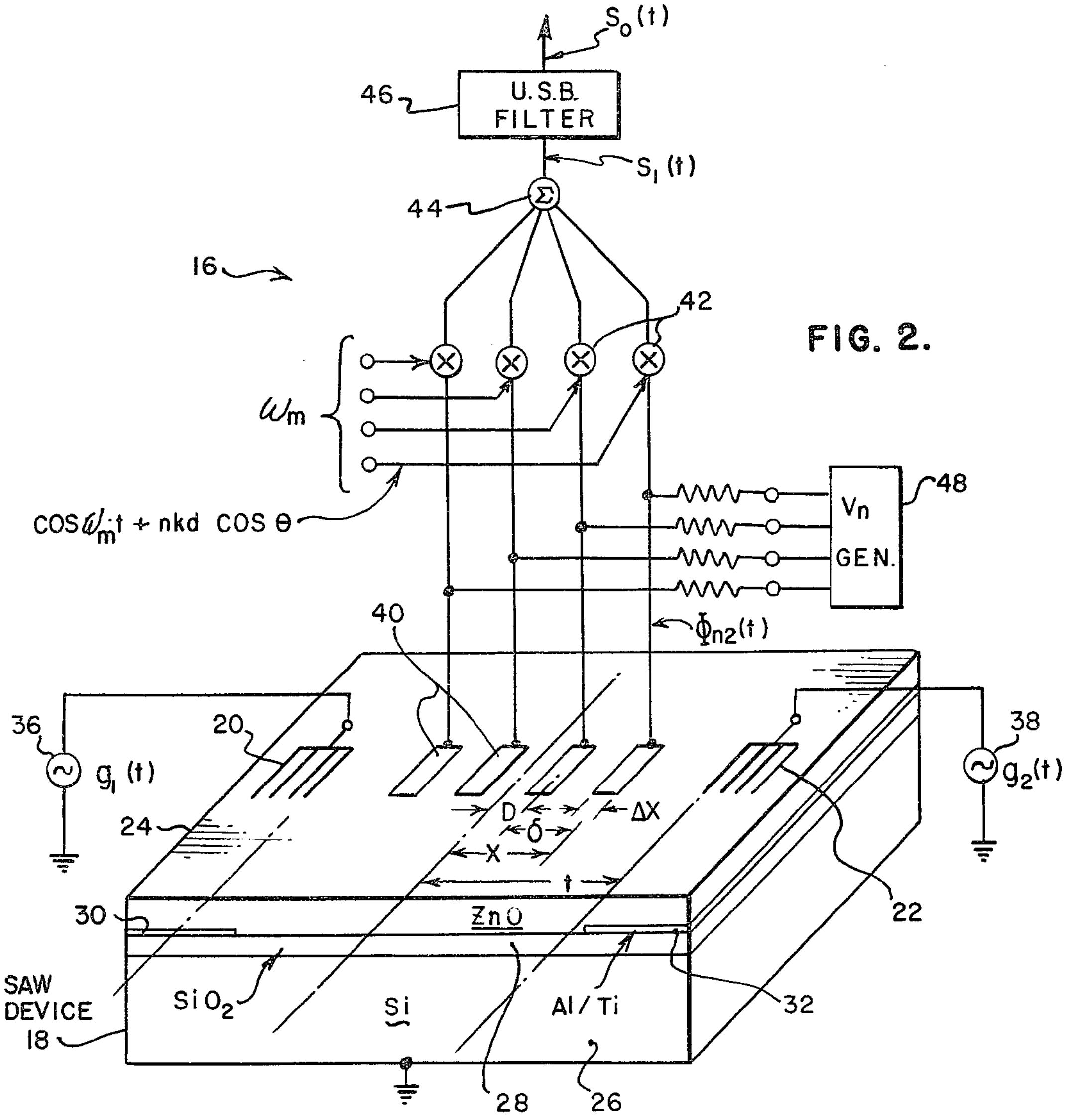
FIG. 2 is a schematic illustration of a surface acoustic wave device for processing signals $\omega_m$ from the listening elements.

An exemplary beamforming apparatus 16 is illustrated in FIG. 2 for processing the outputs $\omega_m$ of the linear array 12 of spaced apart receiving elements 14 shown in FIG. 1. The beamforming apparatus 16 includes a surface acoustic wave (SAW) device 18 which has a pair of transducers 20 and 22 which are mounted on a substrate 24 in a spaced apart relationship, and which may have the same center frequency. The substrate 24 may include a silicon base 26 which has a thermally grown silicon dioxide layer 28 which may be of thickness of 2000° A. Aluminum/titanium layers 30 and 32 may be deposited on the layer 28 in a spaced apart relationship. On top of the silicon dioxide 28 and the aluminum/titanium layers 30 and 32 there may be deposited a film 34 of zinc oxide approximately 1.6 microns in thickness. The transducers 20 and 22, which may be deposited on the zinc oxide layer 34 directly over the layers 30 and 32 respectively, include a plurality of spaced apart fingerlike electrodes which are joined in parallel to signal generators 36 and 38 respectively. The fingerlike electrodes of the transducers may be spaced approximately 20 microns apart to establish a center frequency of 80 MHZ. The signal generators 36 and 38 generate chirp signals $g_1$ and $g_2$, both of these signals having a starting frequency of 80 MHZ, the difference between the chirp signals being that $g_1$ is of up slope and $g_2$ is of a down slope. $g_1$ can start at 80 MHZ and end at 80.4 MHZ while $g_2$ can start at 80 MHZ and end at 79.6 MHZ. Both signals are linear FM chirps. With this arrangement each transducer 20 and 22 is capable of receiving and converting a respective chirp signal into an acoustic signal so that the acoustic signals from both transducers are propagated toward one another across the surface of the SAW device 18.

A plurality of taps 40 are mounted on the surface of the substrate 24 between the pair of transducers 20 and 22 so as to be capable of receiving and converting the acoustic signals back into electrical signals. The number of taps 40 corresponds to the number of listening elements 14 and should be spaced in a proportionate relationship. In the exemplarly embodiment the listening elements 14 are equally spaced which means that the taps 40 would also be equally spaced in order to maintain the proper relationship.

Means, such as multipliers 42, are provided for mixing the signals from each tap 40 with a signal $\omega_m$ from a respective receiving element 14 so as to produce a plurality of mixed output signals. Means, such as a summer 44, is provided for summing the mixed output signals so as to provide a summed output signal, $S_1(t)$. The summed output signal may be processed by an upper sideband filter 46 so as to provide a final output signal $S_o(t)$.

In order to accomplish amplitude shading, means, such as a multiple voltage generator 48, may be provided for generating a plurality of bias voltage, $V_n$. Each tap 40 is connected to the bias voltage generator 48 for receiving a respective bias voltage. By varying the voltages on the generator 48 the output of any tap 40 can be varied so as to correspondingly vary the mixed output signal from the respective multiplier 42.

The method of the present invention is to propagate a pair of acoustic waves toward one another on the surface of a SAW device, such as the device 18 illustrated in FIG. 2; tapping the SAW device in the wavepath at spacings which are proportional to the spacing of the receiving elements; mixing the signal from each tap with a respective signal from the receiving elements so as to provide a plurality of mixed output signals and summing the mixed output signals to provide a summed output signal. The summed output signal may then be processed on upper sideband filter for controlling an indicating device.

Figure 3:
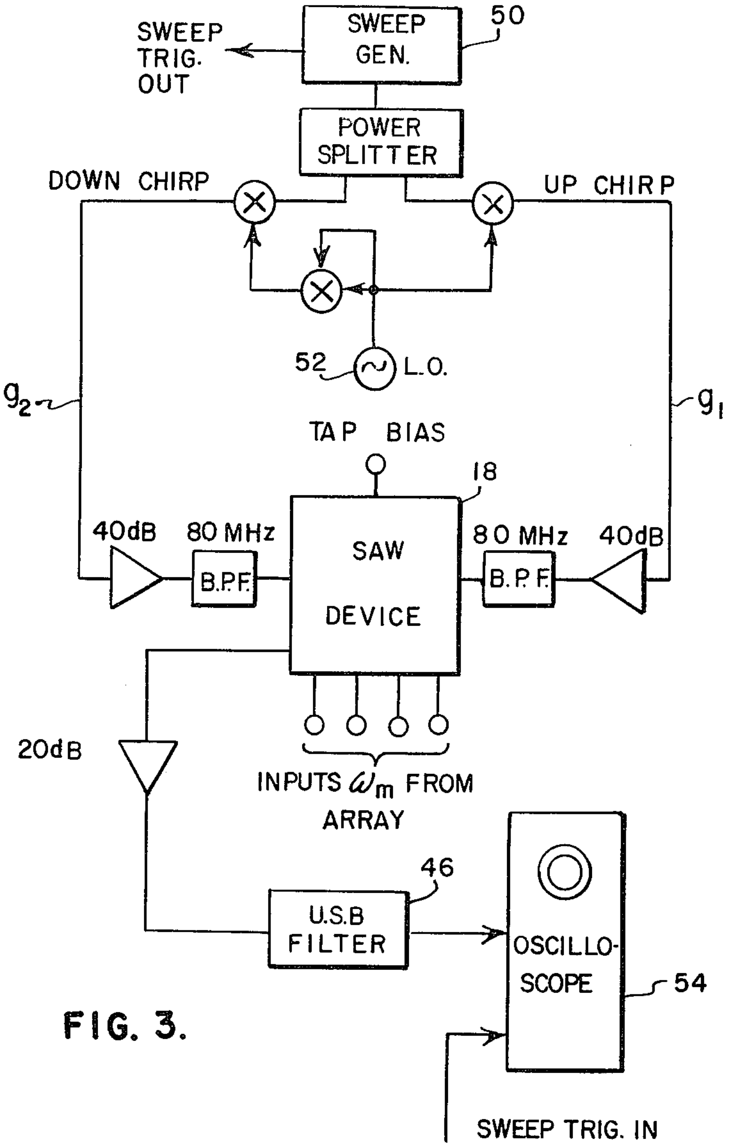
FIG. 3 is a schematic illustration of elements in block form for performing the function of the present invention.
Figure 4:
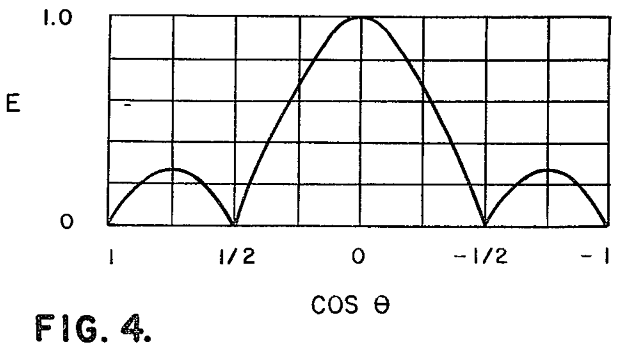
FIG. 4 is a chart illustration of the signal output of the present beamforming apparatus as the apparatus is steered through various directions.

A mockup of the present invention is illustrated in FIG. 3 where the SAW device is illustrated at 18. A sweep generator 50 is utilized to generate an FM chirp. This FM chirp is mixed with the fundamental and the second harmonic frequencies of a local oscillator 52 to produce an up and down chirps, $g_1$ and $g_2$ respectively, each of which has a starting frequency of 80 MHZ, $g_1$ ending at 80.4 MHZ and $g_2$ ending at 79.6 MHZ. The two chirp signals are fed into the input transducers on the SAW device 18 to generate time varying phase shifts at each tap thereon. The signal $\omega_m$ from each array element is mixed with the corresponding phase shift generated at each tap and is then summed with all of the other outputs. This summation signal is then fed to the upper sideband filter 46 which in the mock-up was a 30 KHZ bandwidth filter. The output of the filter 46 was then presented on a scope 54 which produced a detected output as illustrated in FIG. 4. This was the result of utilizing a simulated array input of four 200 KHZ signals applied to the SAW device 18. This simulated a far field point source in a direction normal to the line 12 of the array. As can be seen from FIG. 4, the maximum signal is at "0" for a target normal to the line array. This approach is in effect a method of calibrating the apparatus. For a target which is not normal to the line array, the maximum signal will be to the left or right of the "0" mark so as to indicate instantaneously the bearing of the target from the line array. The number of listening elements 14 and taps 40 illustrated herein is merely exemplary. Additional listening elements and taps may be employed for obtaining greater resolution.

MATHEMATICAL ANALYSIS

The basic building block used in this beamforming scheme is the zinc oxide-on-silicon delay line pictured schematically in FIG. 1. As stated hereinabove, signals $g_1(t)$ and $g_2(t)$ are applied to transducers 20 and 22, respectively. The transducers generate surface acoustic waves across the SAW device 18 that propagate under the taps 40 in the center of the device. Electric fields proportional to the amplitude of the signals $g_1(t)$ and $g_2(t)$ accompany the surface acoustic waves and extend into the depletion regions under each biased tap 40. The potential on the $n^{th}$ tap is given by $$\Phi_n(t) = \int_{D + n\delta - \frac{\Delta x}{2}}^{D + n\delta + \frac{\Delta x}{2}} B(V_n)\, g_1\left(t - \frac{x}{v}\right) g_2\left(t + \frac{x}{v}\right) dx,$$

where:

V = the SAW velocity, $B(V_n)$ = a proportionality constant that depends on the tap bias voltage $V_n$, $\delta$ = the tap spacing, $\Delta x$ = the tap width, D = the distance between the center of the device and the middle of the first tap, x = distance from the center of the device, and t = time from the center of the device.

If the center frequencies of transducers 20 and 22 are the same and if $g_1(t)$ and $g_2(t)$ are linear FM chirps of opposite slope, the second harmonic potential on the $n^{th}$ tap is given by $$\Phi_{n2}(t) = \frac{B(V_n)}{2} \int_{D + n\delta - \frac{\Delta x}{2}}^{D + n\delta + \frac{\Delta x}{2}} \cos\left[2\omega_o t - \frac{\mu 4x}{v} t\right] dx,$$

where:

$\omega_o$ = the starting frequency of the FM chirp, and $\mu$ = the chirp rate. The signal from the $n^{th}$ array element, arising from a plane wave of frequency $\omega_m$ incident on the array, is now mixed with the $n^{th}$ tap output signal $\Phi_{n2}(t)$ and all n outputs are summed, giving $$S_1(t) = \sum_n (\cos \omega_m t + nkd \cos \theta)\Phi_{n2}(t),$$

where:

d = the array element spacing, and $\theta$ = the angle between the far field target direction and the line of the array. When only the upper sideband of this signal is extracted, the final detected output is $$S_o(t) = \frac{\sin \frac{2\mu t}{v} \Delta x}{(\frac{2\mu t}{v})} \sum_n \frac{B(V_n)}{2} [\cos \omega_m t + nkd \cos \theta - \frac{4\mu t}{v} (D + n\delta)];$$

and for sufficiently small Δx, $$S_o(t) \approx \Delta x \sum_n \frac{B(V_n)}{2} [\cos \omega_m t + nkd \cos \theta - \frac{4\mu t}{v} (D + n\delta)].$$

Thus the SAW device serves to add to each of the array elements 14 a time-varying phase term of $4\ \mu t/v\ (D+n\delta)$, which depends on the array element position. A proper choice of the value of the phase term thus allows electrical scanning of the array independent of the array center frequency $\omega_m$. Also, amplitude shading of the array is possible through the tap bias constant $B(V_n)$. The chirp bandwidth required to scan the receiving fields over 180 degrees is given by $$B_c = d/\lambda 1/2(\Delta t),$$

where: λ is the wavelength in the array medium, and Δt is the time delay between adjacent SAW taps 40. The maximum allowable bandwidth of the array signals is determined by the chirp sweep time, the lower limit of which is set by the total propagation time across the delay line. For the case of $d=\lambda/2$ and array signal bandwidths of 30 KHZ, for example, typical chirp bandwidths are about 400 KHZ. The fractional bandwidth required for 80 MHZ transducers then is only 0.005, and consequently dispersion poses no problem for this application. At the expense of increased chirp bandwidth, closer tap spacing, and higher transducer center frequencies, array signal bandwidths of the order of 1 MHZ should be possible.

The present invention is especially adapted for narrowband beamforming purposes. If the signals from the listening elements 14 are broadband, it may be necessary to perform temporal analysis on each array element signal before it is entered into the SAW device. This may be accomplished by a broadband beamforming scheme, such as that proposed by Speiser in his publication "Signal Processing Architectures Using Convolutional Technology", Proceedings SPIE 22nd Annual International Technical Symposium, San Diego, California 1978, 154, where a digital FFT or an analog of Fourier transform was utilized for performing the temporal analysis. The present invention can also be used in conjunction with detection systems other than passive hydrophones, namely: active and passive RF and microwave systems.

Obviously, many modifications and variations of the present invention are possible in the light of the above teachings, and, it is therefore understood that within the scope of the disclosed inventive concept, the invention may be practiced otherwise than as specifically described.

I claim:

1. A beamforming apparatus for processing the outputs of a linear array of spaced apart receiving elements comprising:

a surface acoustic wave (SAW) device having a pair of transducers mounted on a substrate in a spaced apart relationship, each transducer being capable of receiving and converting an electrical chirp signal into an acoustic signal for propagation across the surface of the SAW device;

the substrate of the SAW device having a zinc oxide layer on a silicon/silicon oxide base;

a plurality of taps, wherein each tap is adapted to receive a bias voltage, mounted on the substrate in a spaced apart relationship between said pair of transducers for operating in cooperation with the substrate to receive, square and convert the acoustic signals back into electrical signals;

the spacing between the taps being proportionally matched to the spacing between the receiving elements;

means for mixing the signal from each tap with a signal from a respective receiving element so as to produce a plurality of mixed output signals; and means for summing the mixed output signals so as to provide a summed output signal.

2. A beamforming apparatus as claimed in claim 1 including:

a video device; and an upper sideband device for processing the summed output signal and for feeding the upper sideband thereof to said video device.

3. A beamforming apparatus as claimed in claim 1 including:

means for applying a bias voltage to each tap.

4. A beamforming apparatus as claimed in claim 1 including:

means for generating the chirp signals; and the chirp signals being linear FM chirp signals with the same starting frequency, but of opposite slope.

5. A beamforming apparatus for processing the signal outputs $\omega_m$ of a linear array of m equi-spaced apart receiving elements comprising:

means for generating a pair of chirp signals $g_1(t)$ and $g_2(t)$ wherein the signals are linear FM chirps with the same starting frequency, but of opposite slope;

a surface acoustic wave (SAW) device having a pair of transducers with the same center frequency $\omega_o$ mounted on a substrate in a spaced apart relationship, each transducer being capable of receiving and converting a respective chirp signal into an acoustic signal so that the acoustic signals from both transducers are propagated toward one another across the surface of the SAW device;

the substrate of the SAW device having a zinc oxide layer on a silicon/silicon oxide base;

n taps mounted on the substrate between said pair of transducers in an equi-spaced apart relationship for operating in cooperation with the substrate to receive, square, and convert the acoustic signals back into electrical signals;

means for generating a plurality of bias voltages $V_n$, each tap being connected to the bias voltage generating means for receiving a respective bias voltage;

the resulting potential $\Phi_{n2}(t)$ on the $n^{th}$ tap being $$\Phi_{n2}(t) = \frac{B(V_n)}{2} \int_{D + n\delta - \frac{\Delta x}{2}}^{D + n\delta + \frac{\Delta x}{2}} \cos [2\omega_o t - \frac{\mu 4x}{v} t] \cdot dx$$

where:

B = a proportionality constant based on the tap bias voltage,

D = the distance between the center of the device between said transducers and the middle of the first tap, $\delta$ = the tap spacing, $\Delta x$ = the tap width, t = time in reference to the center of the device between the transducers, x = the distance from the center of the device between the transducers, and V = velocity of the acoustic waves across the device;

means for mixing the signal $\Phi_{n2}(t)$ from each tap with a respective signal $\omega_m$ from a corresponding receiving element so as to produce a plurality of mixed outputs $S_1(t)$ where $$S_1(t) = \sum_n (\cos \omega_m t + nkd \cos \theta)\, \Phi_{n2}(t)$$

where $$k = \frac{2\pi}{\lambda \text{ of listening array}}\text{; and}$$

d = the array element spacing; and means for summing the mixed output signals so as to provide a summed output signal $S_o(t)$ where $$S_o(t) \approx \Delta x \sum_n \frac{B(V_n)}{2} \left[\cos \omega_m t + nkd \cos \theta - \frac{4\mu t}{v} (D + n\delta)\right].$$

6. A beamforming apparatus as claimed in claim 5 including:

a video device; and an upper sideband device for processing the summed output signal and for feeding the upper sideband thereof said said video device.

7. A method of beamforming by processing output signals of a linear array of equi-spaced apart receiving elements comprising the steps of:

providing a surface acoustic wave (SAW) device which has a plurality of equi-spaced apart taps on a substrate wherein the substrate has a zinc oxide layer on a silicon/silicon oxide base;

biasing each of the taps so as to cause depletion regions in the silicon base;

propagating a pair of linear FM chirp signals of opposite slope toward one another and toward the taps so that each tap has a signal which is proportional to the product of the two chirp signals;

mixing the signal on each tap with a respective output signal of a receiving elements to produce a plurality of mixed output signals; and summing the mixed output signals to provide a summed output signal.

8. A method as claimed in claim 7 including:

extracting the upper sideband of the summed output signal and feeding the extracted signal to a video device.

9. A method of processing the outputs of a linear array of spaced apart receiving elements comprising the steps of:

propagating a pair of acoustic waves toward one another on the surface of a surface acoustic wave (SAW) device of the type having a zinc oxide layer on a silicon base;

tapping the SAW device in the wavepath at spacings which are proportional to the spacing of the receiving elements so as to receive the product of the two acoustic waves;

mixing the signal from each tap with a respective signal from the receiving elements so as to provide a plurality of mixed output signals; and summing the mixed output signals to provide a summed output signal.

* * * * *